Aug. 2, 1932.  J. I. HOKE  1,869,746
TRACTOR
Filed May 24, 1930   2 Sheets-Sheet 1
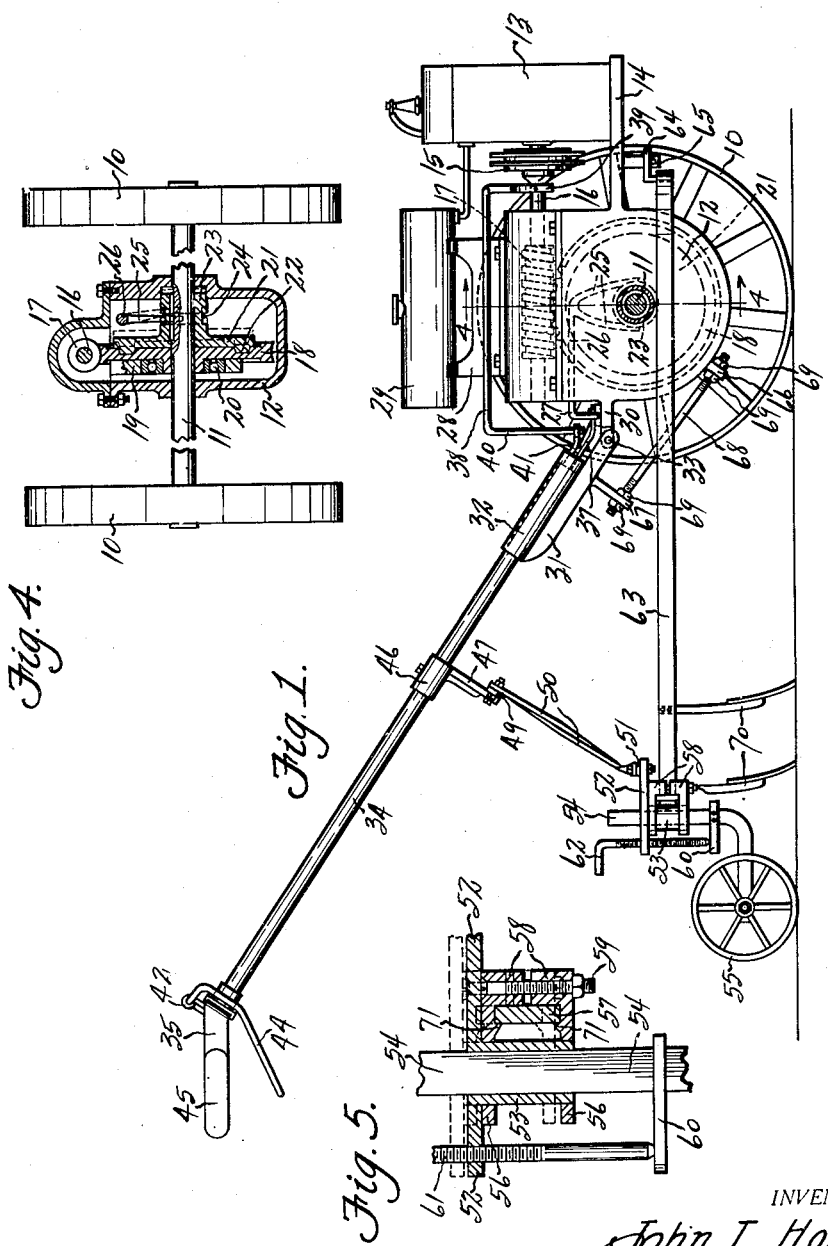
INVENTOR.
John I. Hoke.
BY
ATTORNEY.

Aug. 2, 1932.  J. I. HOKE  1,869,746
TRACTOR
Filed May 24, 1930   2 Sheets-Sheet 2
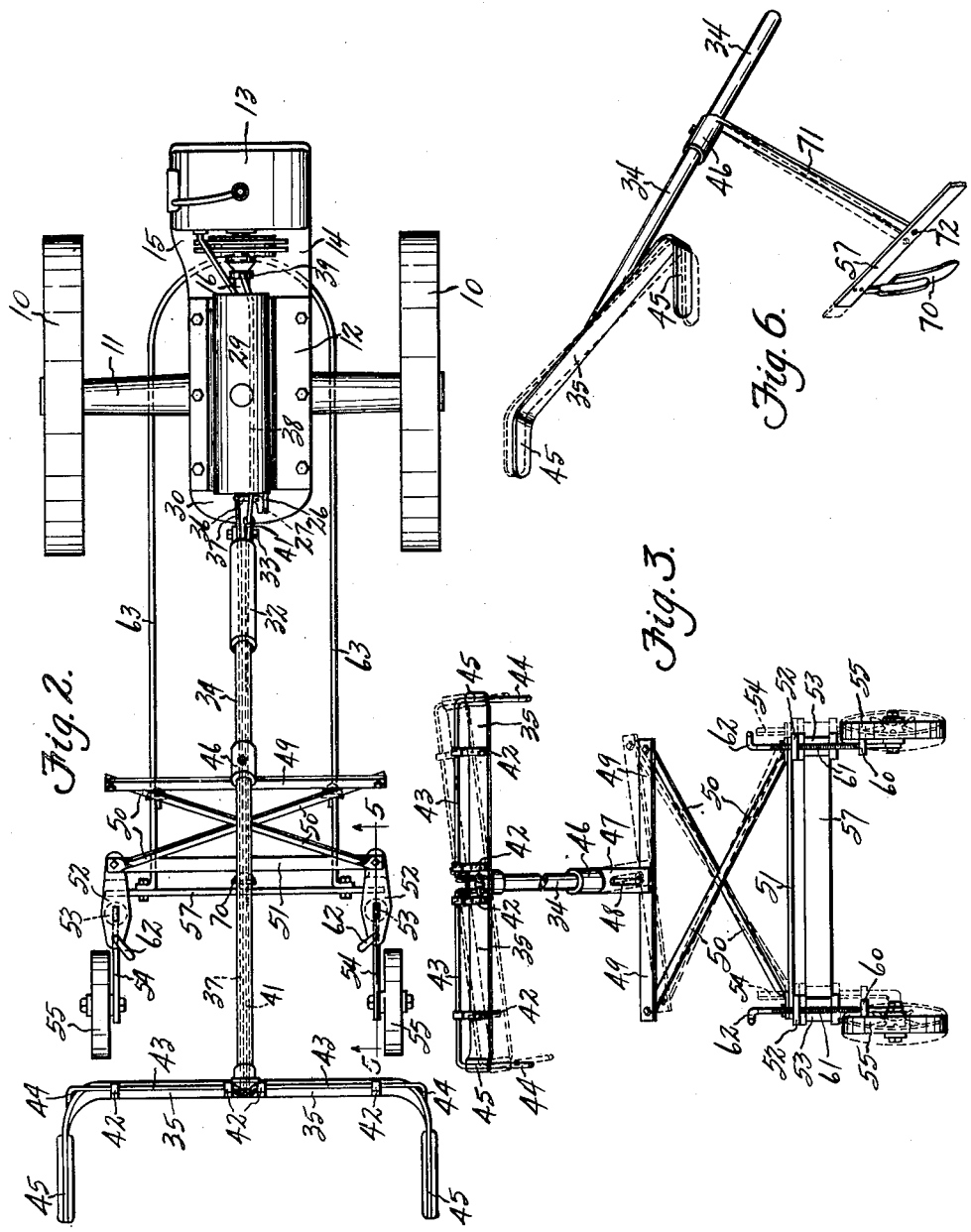
INVENTOR.
John I. Hoke.
BY
ATTORNEY.

Patented Aug. 2, 1932

1,869,746

UNITED STATES PATENT OFFICE

JOHN I. HOKE, OF NEW CARLISLE, INDIANA

TRACTOR

Application filed May 24, 1930. Serial No. 455,413.

The invention relates to tractors, and particularly to small garden tractors, and has for its object to provide a device of this character with an improved steering mechanism controlling the rear pivot wheels whereby the device may be easily guided and turned without undue lateral swinging of the cultivating tools carried thereby.

A further object is to provide a device of this character having a steering mechanism operable by a turn of the handle bar through suitable intermediate connecting means to guide the rear pivot wheels of the tractor, the handle bar carrying the control for the clutch in a manner whereby turning of the handle bar does not effect the position of said control means.

A further object is to provide a device of this character having clutch controlling means adjacent the handle bars, one of said clutch controlling means controlling a dead clutch which may be declutched to permit backward movement of the device without the necessity of a reverse gear mechanism.

A further object is to provide a device of this character in which the handle bars are adjustable as to height, and in which the position of the tool carrying means is also easily adjustable.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings.

Figure 1 is a view of the tractor in side elevation with the near drive wheel removed.

Figure 2 is a top plan view of the tractor.

Figure 3 is a rear view of the steering mechanism.

Figure 4 is a transverse vertical sectional view taken on line 4—4 of Figure 1.

Figure 5 is a longitudinal vertical sectional view of a portion of the steering device and tool carrying means taken on line 5—5 of Figure 2.

Figure 6 is a fragmentary perspective view of a modified form of steering mechanism.

Referring to the drawings, which illustrate the preferred embodiment of my invention, the numeral 1 designates the tractor drive or ground wheels which are mounted on axle 11 which is suitably journaled in the gear housing 12. A suitable gasoline engine 13 is mounted on a flange 14 integrally formed with and projecting forwardly from the gear housing 12, and a suitable clutch 15 is mounted on the drive shaft 16 of said engine. The drive shaft extends into the gear housing and has mounted thereon within said housing a worm 17 which engages a worm gear 18 journaled on the axle 11 and positioned on one side thereof by the member 19 carried by said housing and carrying a bearing 20 in which the hub of the worm gear is mounted. On the other side of the worm gear is disposed a dead clutch member 21 having studs 22 formed on the face thereof adjacent said gear and adapted to be received by recesses formed in the adjacent face of said gear; said dead clutch is keyed to the axle 11 and is adapted for sliding movement longitudinally of said axle. An elongated hub 23 projects from one side of the dead clutch 21 and has a circumferential groove 24 formed therein into which the ends of the fork arms 25 are adapted to be received, said fork arms being carried by a rod 26 journaled in the housing 12 and having a downwardly bent perpendicular arm 27 formed at its outer end, said rod 26 being disposed parallel to the drive shaft 16 and the forked arms 25 being in longitudinal alignment with said rod. On the upper side of the housing 12 is mounted a standard 28 by which the gasoline tank 29 is carried.

A flange 30 integrally formed with the housing 12 extends from the rear of said housing and has pivoted thereto at 33 the flange 31 carried by the collar 32. A tubular shaft 34 has one end thereof rotatably mounted in said collar 32 and extends rearwardly angularly upwardly and carries handle bars 35 at its upper end. A bell crank 36 is pivotally mounted on the flange 30 adjacent the arm 27 of rod 26 and has pivotally connected at one end thereof the rod 37 which extends into the collar 32 and through the tubular shaft 34. A push rod 38 is disposed above and longitudinally of the housing 12 and has a depending transverse bifurcated member 39 formed at the forward end thereof, said bifurcated member 39 being secured to the clutch 15 in a manner whereby longitudinal movement of the rod 38 will operate said clutch; said rod 38 has a downwardly bent portion 40 formed at the rear end thereof to which is fixedly secured a rod 41 which extends through the collar 32 and tubular shaft 34. Carried by the handle bar 35 are a plurality of brackets 42 in which are journaled aligned rods 43 disposed in spaced parallel relation to said handle bar; the adjacent inner ends of said handle bars terminating in perpendicularly bent portions to each of which the upper end of one of the rods 37 and 41 is secured in a manner whereby rotative movement of the rods 43 will pivotally swing the perpendicularly bent portion thereof to longitudinally move the rods 37 and 41 in the tubular shaft. The outer ends of each of the rods 43 terminate in perpendicularly bent handle forming portions 44 extending adjacent the grip portions 45 of the handle bars whereby they may be gripped and brought into contact with the handle bar grip to rotate rod 43 without releasing the handle bar grip.

Intermediate the ends of the tubular shaft 34 is fixedly mounted a collar 46 carrying a depending arm 47, said arm preferably having a longitudinal slot 48 formed centrally therein. A bar 49 is fixedly secured at its center to said arm 47 by a bolt extending through said slot, said bar preferably being in parallel relation to the axle 11. Pivotally mounted on the ends of said bar 49 are two rods 50 which have pivotally mounted at their lower ends a transverse bar 51 normally in parallel registration with the bar 49. The rods 50 extend diagonally between the ends of the bars 49 and 51 and their lower ends are preferably bent in a manner whereby the bar 51 has its upper and lower faces horizontally disposed. Arms 52 are pivotally mounted on the ends of the bar 51 and extend rearwardly therefrom, said arms each having an integral cylindrical member 53 depending therefrom intermediate the ends thereof. A configured aperture extends vertically through each arm 52 and in this aperture is slidably mounted a swivel bar 54, said aperture and swivel bar being of the same configuration whereby said bar may not rotate relative to said arm, and on the lower end of each swivel bar is mounted a pivot wheel 55. Journaled on each cylinder member 53 in spaced parallel relation are plates 56, Figure 5, and between the forward ends of each set of plates 56 is clamped one end of a transverse ground tool carrying bar 57. The forward ends of said plates 56 carry inwardly directed bosses 58 through which a suitable bolt 59 may extend to draw said plates into clamping relation with said tool bar 57, said plates carrying shoulders 71 spaced from said bosses 58, and the tool bar 57 is correctly positioned between said bosses and shoulders. A perpendicularly projecting arm 60 is fixedly carried by each swivel bar 54 adjacent the lower end thereof, and a screw 61 is threaded through the arm 52 with its end bearing upon said projecting arm 60 so that rotation of said screw will vertically move the arm 52 and the assembly which it carries relative to the swivel bar, said screw is preferably provided with a bent portion 62 at its upper end to form a gripping member. The ends of a U-shaped ground tool carrying bar 63 are secured to the tool bar 57, said U-shaped bar 63 extending forwardly and around the gear housing 13. An angle bracket 64 is secured to the forward end of the U-shaped bar 63 and is suitably carried by a depending arm 65 carried by the flange 14 of the gear housing, said arm 65 and bracket 64 supporting the forward end of said U-shaped bar. A flange 66 is integrally formed with the gear housing and projects from the lower rear side thereof, and a perpendicularly depending flange 67 is integrally formed with the flange 31, and these flanges 66 and 67 are interconnected by a threaded bar 68 carrying suitable nuts 69 disposed on both sides of said flanges by the rotation of which nuts the spacing of said flanges is regulated whereby the angular disposition of the collar 32 and tubular shaft 34 with respect to the horizontal is regulated. Suitable ground working tools 70 are carried by said tool bar 57 and U-shaped bar 63.

It will thus be seen that all of the operative cantrol means may be controlled from the handle bar. The rods 43 may be rotated by means of handles 44 by the fingers while the hands remain on the handle bar grips, and thus actuate the rods 37 and 41 which control the dead clutch 21 and drive clutch 15, respectively; so that when the engine is running and it is desired to start the tractor it is necessary only to grip and hold one of the handles 44 in contact with the adjacent handle bar grip, and when it is desired to pull the tractor backward the other handle 44 may be gripped and held in contact with the adjacent handle bar grip. Obviously the provision of this dead clutch to permit the tractor to be pulled backwardly is a much simpler arrangement than a reverse gearing, and a light weight garden tractor may easily be pulled for short distances.

When it is desired to turn the pivot wheels 55 the handle bar is moved to rotate the shaft 34 on its axis, this moves the arm 47 through an arc with the shaft axis as its center, said arm carrying the upper transverse bar 49 therewith, whereby the normally parallel upper and lower transverse bars 49 and 51 are moved into angular relation with each other, said lower bar 51 being longitudinally shifted in the direction in which the arm 47 is swung, as illustrated in Figure 3 in dotted lines. The longitudinal shifting of the lower bar 51 pivots the arm 52 relative to its normal position and in so doing the swivel bar 54 is also turned or swiveled so that the wheels are pivoted in the direction in which the lower bar is shifted. Pivotal movement of the arms 52 and the coincident rotative movement of the cylindrical members 53 does not affect the tool bar 57 however, as the plates 56 between which the tool bar is clamped are journaled on the cylindrical member so that said cylindrical member may have rotative movement independent of said plates.

Upon rotation of the screw 61, the arms 52, cylindrical members 53, plates 56, and tool bars 57 and 63 which are carried by the arm 52 may be raised or lowered on the swivel bars relative to the wheels, and thus ground tools of different heights and sizes may be accommodated by the device. The slot 48 in the arm 47 permits of vertical adjustment of the transverse bars and the assembly carried by the pivoted arms 52 without affecting the angular position of the tubular shaft 34, and the angular disposition of the tubular shaft may be regulated by the nuts 69 carried by the threaded bar 68 and bearing against the flanges 66 and 67.

In Figure 6 is illustrated a modified form of the invention in which the construction is substantially modified and simplified. This construction comprises a collar 46 fixedly secured to the shaft 34 in the same manner as in the preferred construction, and depending from and fixedly secured to the collar 46 is a bar 71 to the lower end of which may be pivoted at 72 the ground tool carrying bar 57. Any suitable rear wheels, pivoted or fixed, may be secured to the tool bar 57 if desired. Thus shifting of the handle bar 35 to rotate the shaft 34 will cause said bar 71 to be swung from side to side and to carry with it the tool carrying bar and any wheels or rear end assembly which might be carried thereby; and the pivotal connection between the bar 71 and tool carrying bar 57 permits the tool carrying bar to move laterally without tilting relative to the ground.

The invention having been set forth, what is claimed as new and useful is:

1. In a tractor having rear pivot wheels and a control shaft adapted to rotate about its longitudinal axis, the combination of a bracket fixedly carried by said shaft, an upper cross bar secured at its center to said bracket, a lower cross bar spaced from the upper cross bar, rods pivotally carried by said cross bars and extending diagonally between the ends thereof, members rotatably mounting said wheels, and arms pivotally carried by the lower cross bar and supporting said wheel mounting members whereby lateral movement of said arms will turn said mounting members and wheels.

2. In a tractor having rear pivot wheels and a control shaft adapted to rotate about its longitudinal axis, the combination of a bracket secured to said shaft, upper and lower spaced transverse bars, said bracket mounting said upper bar, rods pivotally carried by said bars and extending diagonally between the opposite ends thereof, and means operatively connecting said pivot wheels with the lower bar whereby lateral movement of said bar will pivot said wheels.

3. In a tractor having rear pivot wheels and a control shaft adapted to rotate about its longitudinal axis, the combination of a transverse bar fixedly carried by said shaft, a lower bar spaced from said transverse bar, diagonal rods pivotally connected to and extending between said bars, and means operatively connecting said pivot wheels with said lower bar whereby lateral movement of said bar will pivot said wheels.

4. In a tractor having rear pivot wheels and a control shaft adapted to rotate about its axis, the combination of a transverse bar fixedly carried at its center by said shaft, a lower bar spaced from said transverse bar, diagonal rods pivotally connected to and extending between said bars, arms pivotally carried by said lower bar and having cylindrical members formed integrally therewith, members mounting said pivot wheels and passing through configured apertures formed in said cylindrical members and arms, spaced plates journaled on said cylindrical members, and a transverse ground tool carrying bar clamped between said plates.

5. In a tractor having rear pivot wheels and a control shaft adapted to rotate about its axis, the combination of a transverse bar fixedly secured at its center to said shaft, a lower bar spaced from said transverse bar, diagonal rods pivotally connected to and extending between said bars, arms pivotally carried by the lower bar, members mounting said wheels, said members passing through configured apertures formed in said arms whereby pivotal movement of said arms pivots said wheels.

6. In a tractor having rear pivot wheels and a control shaft adapted to rotate about its axis, the combination of a transverse bar fixedly secured at its center to said shaft, a lower bar spaced from said transverse bar, diagonal rods pivotally connected to and extending between said bars, arms pivotally carried by said lower bar and having configured apertures therein, members mounting said wheels, said members passing through said apertures, cylindrical members carried by said arms, plates journaled on said cylindrical members, and a ground tool carrying bar clamped between said plates.

7. In a tractor having rear pivot wheels and a control shaft adapted to rotate about its axis, the combination of a transverse bar fixedly carried at its center by said shaft, a lower bar spaced from said transverse bar, diagonal rods pivotally connected to and extending between said bars, arms pivotally carried by the lower bar, members mounting said wheels and slidably carried by said arms, an arm projecting from each wheel mounting member, and a screw threaded through each pivoted arm and bearing upon one of said projecting arms, whereby rotation of said screws produces vertical sliding movement of said pivoted arms relative to said wheel mounting members.

8. In a tractor having rear pivot wheels and a control shaft adapted to rotate about its axis, the combination of a transverse bar fixedly carried at its center by said shaft, a lower bar spaced from said transverse bar, diagonal rods pivotally connected to and extending between said bars, arms pivotally carried by the lower bar, members mounting said wheels and slidably carried by said arms, and means for vertically adjusting the position of said arms on said wheel mounting member.

9. In a tractor having rear pivot wheels and a control shaft adapted to rotate about its axis, the combination of a transverse bar fixedly carried by said shaft, a lower bar spaced from said transverse bar, diagonal rods pivotally connected to and extending between said arms, arms pivotally carried by said lower bar, members mounting said wheels and slidably carried by said arms, a ground tool carrying member carried by said arms, and means for vertically adjusting the position of said arms and tool carrying member relative to said wheel mounting member.

10. In a tractor having rear pivot wheels and a control shaft adapted to rotate about its axis, the combination of a transverse bar fixedly carried by said shaft, a lower bar spaced from said transverse bar, diagonal rods pivotally connected to and extending between said arms, arms pivotally carrid by said lower bar, members mounting said wheels and slidably carried by said arms, a ground tool carrying member carried by said arms, an arm projecting from each wheel mounting member, and a screw threaded through each pivoted arm and bearing against one of said projecting arms whereby rotation of said screws will vertically move the arm and tool carrying member.

11. The combination with a tractor having a frame, ground wheels carried by said frame, a rear pivot wheel carried by said frame, a motor carried by said frame, a clutch, and a control shaft carried by said frame, of clutch controlling means carried by said frame, and means carried by said control shaft and associated with said pivot wheel whereby rotation of said control shaft on its axis will pivot said wheel, said clutch control means being carried by said shaft in a manner whereby it will not be affected by rotation of said shaft.

12. The combination with a tractor having a frame, a motor carried by said frame, a clutch, a tubular control shaft rotatably carried by said frame, a rear pivot wheel carried by said frame, clutch control means extending through said tubular control shaft, and means carried by said control shaft and associated with said pivot wheel whereby rotation of said shaft pivots said wheel without interference from said clutch control means.

13. The combination with a tractor having a frame, ground wheels carried by said frame, a rear pivot wheel carried by said frame, and a control shaft carried by said frame, of means carried by said control shaft and associated with said pivot wheel whereby rotation of said control shaft about its axis will pivot said wheels, and means for vertically adjusting the position of said pivot wheel relative to said frame.

14. In a tractor having rear pivot wheels and a control shaft adapted to rotate about its axis, the combination of a cross bar operatively associated with said control shaft, members rotatably mounting said wheels, and arms pivotally carried by said cross bar and supporting said wheel mounting members, said cross bar being laterally shifted upon rotation of said control shaft to pivot said arms and wheel mounting members.

15. The combination with a tractor having rear pivot wheels and a control shaft rotatable about its axis, of a transverse bar operatively associated with said control shaft, arms pivoted to said transverse bar and having cylindrical members integrally formed therewith, members mounting said wheels and passing through configured apertures in said cylindrical members and arms, spaced plates journaled on said cylindrical members, and a transverse ground tool carrying bar clamped between said plates.

16. The combination with a tractor having rear pivot wheels and a rotatable control shaft, of a transverse bar operatively associated with said control shaft, arms pivotally carried by said transverse bar, members mounting said wheels and passing through configured apertures formed in said arms, rotation of said shaft being adapted to laterally move said transverse bar and pivot said arms and wheels.

17. The combination with a tractor having rear pivot wheels and a rotatable control shaft, of a transverse bar operatively connected to said control shaft, arms pivotally carried by said transverse bar, members mounting said wheels and slidably carried by said arms, said wheels being pivoted by rotation of said shaft to laterally shift said bar, an arm projecting from each wheel mounting member, and a screw threaded through each pivoted arm and bearing upon one of said projecting arms whereby rotation of said screws vertically slides said pivoted arms relative to said wheel mounting members.

18. The combination with a tractor having pivot wheels and a control shaft rotatable about its axis, of a transverse bar operatively associated with said control shaft, arms pivotally carried by said shaft, members mounting said wheels and vertically slidably carried by said bars, and means for vertically adjusting the position of said arms relative to said wheel mounting members, said wheels being pivoted upon lateral shifting of said bar by rotation of said shaft.

19. The combination with a tractor having pivot wheels and a control shaft, of a transverse bar, means laterally shifting said bar upon rotation of said shaft, arms pivotally carried by said bar, members mounting said wheels and slidably carried by said arms, a ground tool carrying bar pivotally connected to said arms, and means for vertically adjusting the position of said tool bar and transverse bar relative to said wheel mounting members.

20. The combination with a tractor having pivot wheels and a rotatable control shaft, of a transverse bar operatively associated with said shaft, members mounting said wheels and pivotally connected to said transverse bar, and a tool carrying bar extending between and pivotally carried by said wheel mounting members.

21. The combination with a tractor having a frame, a motor carried by said frame, a clutch, a pivot wheel carried by said frame, of a hollow shaft carried by said frame and rotatable to pivot said wheel, a handle carried by said shaft, a clutch control rod extending through said shaft and adapted to operate said clutch, and a member carried by said handle and operable to control said rod, said control member being pivoted to said rod whereby said shaft and control member may rotate relative to said rod.

In testimony whereof I affix my signature.

JOHN I. HOKE.